United States Patent [19]

Sandler

[11] Patent Number: 4,541,039

[45] Date of Patent: Sep. 10, 1985

[54] MAGNETICALLY MODULATED D-C TO D-C FORWARD CONVERTER POWER SUPPLY

[75] Inventor: Steven M. Sandler, Bohemia, N.Y.

[73] Assignee: Venus Scientific Inc., Farmingdale, N.Y.

[21] Appl. No.: 573,555

[22] Filed: Jan. 25, 1984

[51] Int. Cl.³ ............................................ H02P 13/22
[52] U.S. Cl. ........................................ 363/21; 363/97
[58] Field of Search ............................. 363/19, 21, 97

[56] References Cited

U.S. PATENT DOCUMENTS

| | | | |
|---|---|---|---|
| 3,072,837 | 1/1963 | Hakimoglu | 363/19 |
| 3,697,851 | 10/1972 | Mast | 363/19 |
| 4,020,408 | 4/1977 | Grant | 363/21 |
| 4,353,113 | 10/1982 | Billings | 363/21 |
| 4,389,702 | 6/1983 | Clemente et al. | 363/21 |

OTHER PUBLICATIONS

Harada et al., "Pulse Synchronizing DC-to-DC Converters", PESC '80 Record, IEEE Power Electronics Specialists Conf., Atlanta, Ga., Jun. 16-20, 1980, pp. 302-307, note especially FIG. 14(b).

Primary Examiner—William H. Beha, Jr.
Attorney, Agent, or Firm—Ostrolenk, Faber, Gerb & Soffen

[57] ABSTRACT

A d-c to d-c forward converter power supply has a magnetic modulator in the timing circuit which operates between its residual magnetic flux density and its saturation flux density to deliver a fixed number of volt seconds during sequential clock interval periods. The clock period is fixed so that the output voltage averaged over each clock period will be constant and independent of input voltage over a given design range. A bias current is applied to the magnetic modulating transformer to controllably modify volt second capability of the device. In one embodiment, two transformers are employed, one of which is non-saturating and the other of which is a control transformer and saturates during its operation. In a second embodiment of the invention, only a single transformer, which is a saturating transformer, is employed.

13 Claims, 5 Drawing Figures

MAGNETICALLY MODULATED D-C TO D-C FORWARD CONVERTER POWER SUPPLY

BACKGROUND OF THE INVENTION

This invention relates to power supply circuits and more specifically relates to a novel power supply circuit which employs a magnetic modulator in the timing transformer for the converter.

D-C to d-c forward converter power supplies are well known. Such power supplies employ transformers and magnetic filter components of relatively large volume and weight. Moreover, existing converters of this type require a relatively large number of parts and cannot be regulated over a very wide frequency band. Also, output voltage variation in existing converters due to line voltage variation has been relatively high.

BRIEF DESCRIPTION OF THE INVENTION

In accordance with the present invention, a novel d-c to d-c forward converter power supply is provided with a novel magnetic modulator in the timing transformer of the converter. The magnetic modulator operates from its residual magnetic flux density to its saturation flux density in order to deliver a fixed number of volt seconds from the input d-c power source to the d-c output during sequential clock interval periods. Since the volt second output is fixed, if the clock period is also fixed, the output voltage averaged over each clock period will be constant and independent of the input voltage over a given design range. As a result, the novel d-c to d-c converter has an inherent input voltage regulation capability with an effective regulation band width equal to the clock frequency.

A bias current is applied to a winding of the magnetic modulating transformer in order to controllably modify the effective residual magnetic flux density quiescent point of the magnetic system. A control circuit compares a sample of the output voltage to a reference voltage signal, thereby to generate an error voltage. The amplified error voltage is then used to generate the controlled bias current which in turn controls the output voltage.

In one circuit which employed the present invention, output voltage variation due to change in the input voltage, e.g. line regulation, was reduced by more than 30 db. Thus, for an off-line converter operating from a rectified three phase 400 Hz. line (which generates approximately 12% peak to peak ripple at 2,400 Hz.), the output ripple was filtered by regulation to less than 0.1% of the d-c output voltage. This premitted a very significant reduction in weight and volume of the power supply since it minimized the need for input ripple filters.

Other advantages of the novel invention include an inherently isolated feedback channel and a minimum clock pulse width which may be less than about 250 nanoseconds. Other numerous advantages provided by the present invention are:

(a) inherent line regulation over a very wide frequency band;
(b) reduced magnetic component size due to elimination of transient conditions;
(c) very high packing density;
(d) a low parts count which provides low cost and high reliability for the circuit;
(e) any desired number of control ports which can each be isolated from one another;
(f) an almost 0% duty cycle which allows the use of simplified constant current limiting schemes at 100 KHz. and higher;
(g) a totally synchronous operation if desired;
(h) better d-c regulation due to the additional 30 db. inherent gain;
(i) the saturating magnetics have a very high noise immunity and thus work well in "noisy" environments.

BRIEF DESCRIPTION OF THE DRAWINGS

FIG. 4 is a block diagram of a second embodiment of the invention employing a single transformer.

DETAILED DESCRIPTION OF THE DRAWINGS

Figure 1:
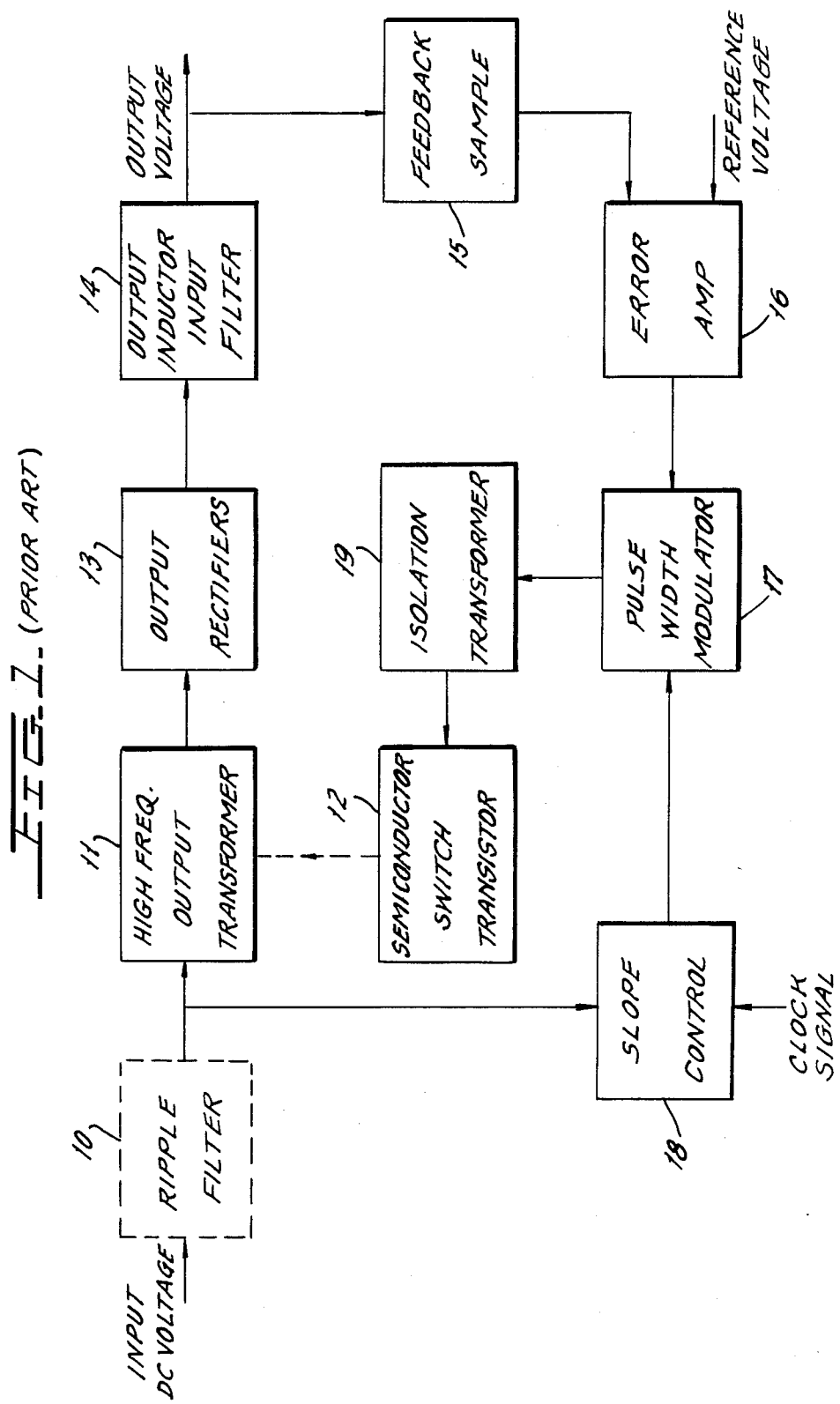
FIG. 1 is a block diagram of a prior art type feed forward converter.

Referring first to FIG. 1 which shows a prior art type of feed forward converter, there is a suitable source of input d-c voltage which may be first applied through a ripple filter 10 and then to a high frequency output transformer 11. A semiconductor switching circuit 12 is appropriately coupled to the high frequency output transformer 11 to convert the input d-c voltage to a pulse voltage which is transformed by the transformer 11. The output of transformer 11 is applied to conventional output rectifiers 13 which in turn are connected through an output inductor filter 14 to produce the relatively low ripple d-c output voltage.

A feedback sampling circuit 15 samples the output voltage of filter 14 and the feedback sample is applied to a suitable error amplifier 16 which compares the feedback sample to a reference voltage to produce a suitable error voltage output which controls a pulse width modulator circuit 17. The pulse width modulator circuit 17 also receives an input from a slope control circuit 18 which also has connected thereto a clock signal. The slope control circuit 18 is also connected to the input d-c voltage which passes through the ripple filter 10. The output of the pulse width modulator 17 is then applied through a suitable isolation transformer 19 to the semiconductor switch circuit 12 to modulate the pulse width output of the semiconductor switch circuit 12.

In the operation of the circuit of FIG. 1, the pulse width modulator 17 accepts the amplified error voltage from amplifier 16 and creates a drive pulse chain at the clock signal frequency connected to the slope control circuit 18. This pulse chain has a pulse width which is proportional to the error signal. The semiconductor switch circuit 12, together with the output transformer 11, then modulates the input d-c voltage appropriately.

Note that if a previously filtered d-c voltage is available, the ripple filter 10 is not needed. The ripple filter 10 is used principally when the input d-c voltage is produced by rectifying an a-c line and is then needed since the band width of the control loop would be normally inadequate to filter the ripple by regulation.

The conventional circuit of FIG. 1 in practice employs a relatively large number of parts and the transformer and filter components have a relatively large weight and volume. Moreover, an additional transformer is required to isolate the feedback channel, and the circuit normally has a relatively large clock pulse width.

Figure 2:
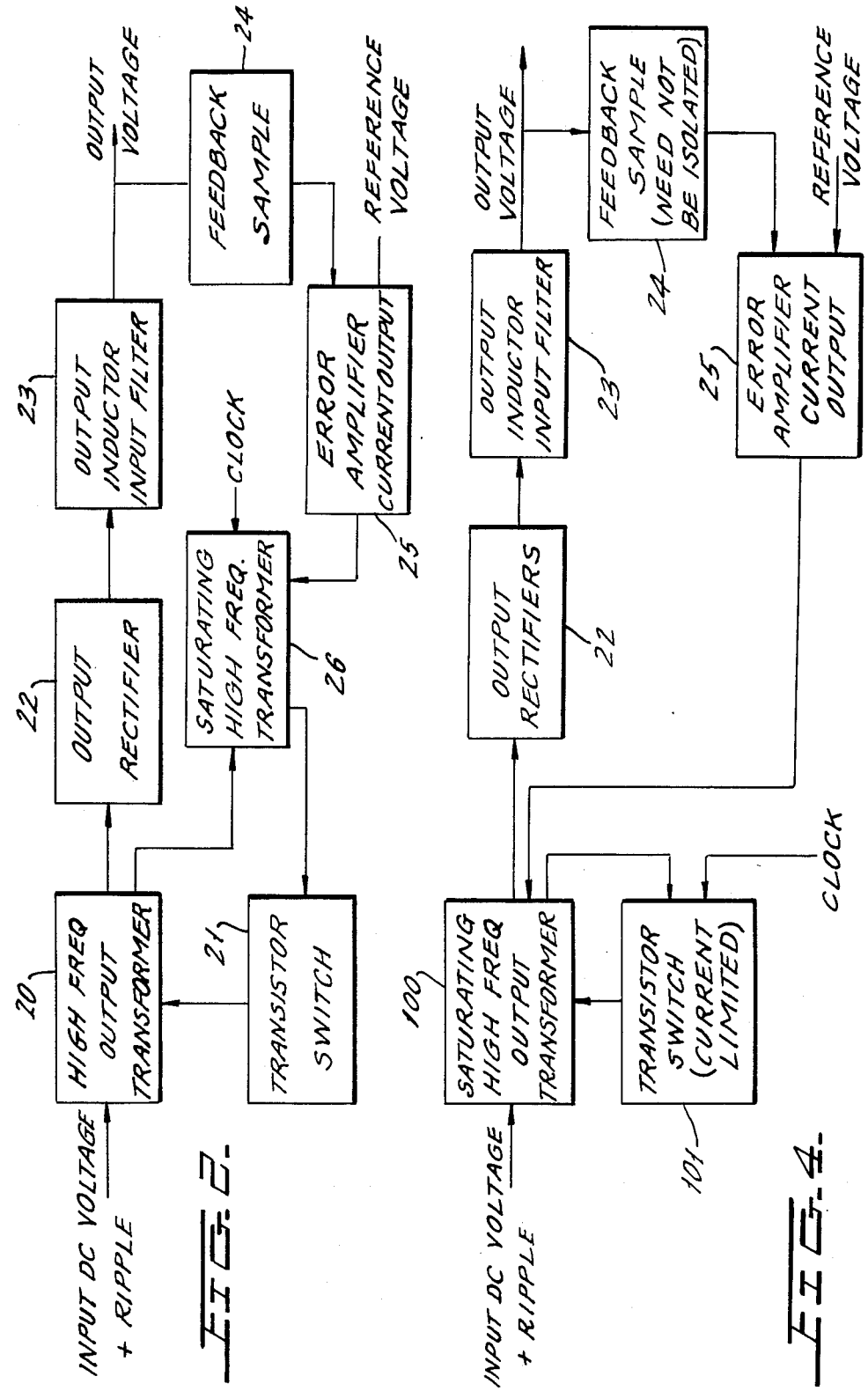
FIG. 2 is a block diagram of a novel two-transformer magnetically modulated feed forward converter constructed in accordance with the invention.

FIG. 2 schematically illustrates, in block diagram form, a first embodiment of the present invention which is a double-transformer magnetically modulated feed forward converter. Referring to FIG. 2, the input to the circuit consists of the labeled "input d-c voltage plus ripple" which is applied to a high frequency output transformer 20. Transformer 20 is a conventional non-saturating transformer. Transformer 20 operates in cooperation with a transistor switching circuit 21 which causes the transformer 20 output to consist of output power pulses which are applied to the conventional output rectifier 22. The output of the rectifiers 22 are applied through an output inductor and input filter 23. The output voltage, which is labeled in FIG. 2, is sampled by a suitable feedback sampling circuit 24 and the sample is applied to the error amplifier current output circuit 25, which compares the feedback sample to the labeled reference voltage.

The output of the error amplifier circuit 25 is then applied to the novel saturable high-frequency transformer 26 of the invention which also receives a clock signal from the labeled clock and an output signal from the high-frequency output transformer 20. The saturable high-frequency transformer 26 also applies a suitable control signal to the transistor switching circuit 21 which controls the output of transformer 20 to produce the desired output voltage for the overall circuit.

Figure 3:
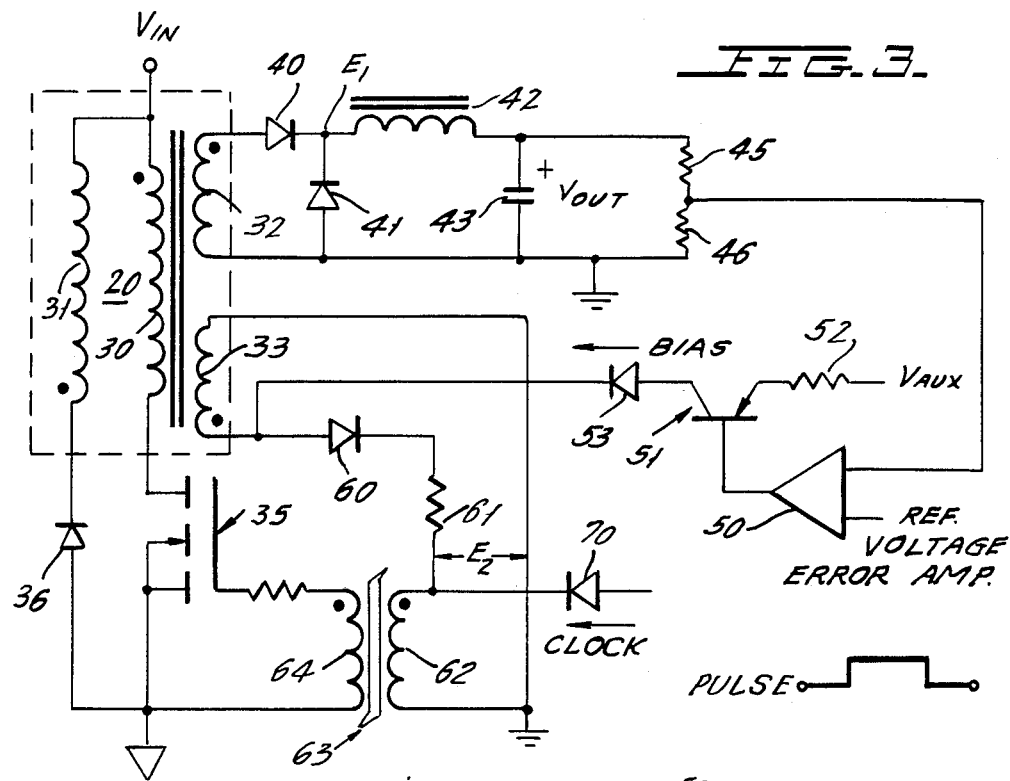
FIG. 3 is a circuit diagram of the novel two-transformer magnetically modulated feed forward converter of FIG. 2.

The detailed manner in which the novel saturating high-frequency transformer 26 of FIG. 2 is employed is shown in FIG. 3. Referring to FIG. 3, there is schematically shown the voltage $V_{in}$ which corresponds to the input d-c voltage plus ripple of FIG. 2. The voltage $V_{in}$ is applied to the high-frequency output transformer 20 which contains a primary winding 30, a reset winding 31 and two secondary windings 32 and 33. Windings 30, 31, 32 and 33 are wound with polarities indicated by the dots.

Primary winding 30 is connected in series with high-power MOSFET transistor 35 which can be of any of the commercially available types. Other switching devices could have been used. The reset winding 31 is connected in series with the diode 36. The reset winding 31 and diode 36 are connected in parallel with primary winding 30 and MOSFET power transistor 35.

The output rectifier 22 of FIG. 2 is formed by diodes 40 and 41 in FIG. 3 which are connected to the output inductor 42 and filter capacitor 43. The output voltage $V_{out}$ then appears across the capacitor 43.

A resistor divider circuit composed of series-connected resistors 45 and 46 is connected across the output terminals and the voltage $V_{out}$ and serves and the feedback sample circuit 24 of FIG. 2. The measured output voltage appearing at the node between resistors 45 and 46 is applied to one input terminal of error amplifier 50 which compares the magnitude of the measured voltage to a reference voltage applied to its other input terminal. The output of error amplifier 50 is applied to the base of transistor 51 in order to control the bias current drawn from an auxiliary voltage source $V_{aux}$ through resistor 52 and diode 53 which will be later described.

The output of secondary winding 33 of FIG. 3 is applied through the diode 60 and through resistor 61 to the primary winding 62 of a saturable transformer 63 which acts as the novel magnetic modulator for the forward converter power supply of FIG. 3. Saturable transformer 63 has a magnetic core which may be of any desired material. A silicon steel tape, wound in the shape of a toroid has been used. By saturable transformer is meant herein a transformer which saturates intentionally during the normal operation of the circuit. Saturable transformer 63 also has secondary winding 64 which is connected between the gate and drain electrodes of the transistor 35. A clock pulse source which is labeled in FIG. 3 is connected through diode 70 to the primary winding 62 of the saturable transformer 63. Any suitable clock pulse source can be used.

The operation of the circuit of FIG. 3 is next described. The clock pulse source which is labeled in FIG. 3 provides a positive going clock pulse, which is schematically illustrated in FIG. 3, to the primary winding of the saturable drive transformer 63. The clock pulse signal which is transformed into secondary winding 64 turns on the power transistor 35 so that the input voltage $V_{in}$ is impressed across the primary winding 30 of the non-saturating output transformer 20.

The voltage induced into secondary winding 32 of transformer 20 is rectified by the diode 40 into a d-c output voltage at the node between the cathodes of diodes 40 and 41. An induced voltage also appears across secondary winding 33 to impress a voltage $E_2$ across primary winding 62 of the saturable drive transformer 63. As a result, the output drive voltage will remain latched on the gate of transistor 35.

During this time the primary current in primary winding 62 of drive transformer 63 increases as a function of the primary circuit inductance. Once the transformer 63 saturates, however, the magnetizing current needed to form the primary flux density is more than can be supplied through the resistor 61. Consequently, the primary voltage of transformer 63 falls to zero, causing the drive voltage to be removed from transistor 35. This removes the drive voltage from primary winding 30 and causes the transformer 20 to reset and return to its residual flux density point through the reset winding 31 and diode 36. The removal of the primary voltage from winding 30 also causes diode 40 to stop conducting, and free-wheeling diode 41 begins to conduct to maintain current flow in the inductor 42 as in a conventional inductor input filter. The removal of voltage from the transformer secondary 32 also causes the saturable drive transformer 63 to reset to its quiescent point and thus ready itself for the next cycle.

The function of the bias current produced from the output of transistor 51 is next described. Assuming that the output current of the transistor 51 is zero, the reset condition of the saturable transformer 63 is the residual flux density at zero current. For a given transformer design, the time it takes for the transformer to change its flux density from its zero current residual value to saturation flux density is inversely proportional to the voltage impressed across the transformer winding 62. This characteristic results in the transformer having a constant volt second product, as is well known. Thus, the time period T during which the transformer 63 provides a drive output to transistor 35 is inversely proportional to the drive voltage $E_2$ and therefore to the voltage $V_{in}$. For example, if $V_{in}$ increases by 10%, the time period T will decrease by 10%. Note that the voltage amplitude $E_1$ at the node between diodes 40 and 41 also increases by 10% but is present for 10% less time. Also note that this occurs on a pulse-by-pulse basis.

Since the above action occurs on a pulse-by-pulse basis, the correction for input voltage change will also be on a pulse-by-pulse basis and thus is at the clock frequency. This then establishes the correction frequency or band width for this technique.

The output voltage averaged over one clock period is proportional to the number of volt seconds required to cause transformer 63 to go to saturation, divided by the clock period. If the clock period is constant, the output voltage will also be constant despite variations of the input voltage. This then constitutes excellent input line regulation. Because of the high band width inherent in the novel technique, it readily eliminates input voltage ripple or input voltage change by regulation up to a frequency of about 90% of the clock frequency.

As pointed out previously, the residual flux density for transformer 63 acts as the starting point for the operation of the control transformer when bias current from transistor 51 is zero. This residual flux density is readily modified with the injection of a d-c bias current into the control transformer 63. The bias control in FIG. 3 appears to the transformer 63 as a portion of the magnetizing current. Thus, this increases the starting magnetic flux density from its ordinary residual flux density to some larger value. Thus, in turn, decreases the excursion in flux density needed to reach saturation and effectively reduces the volt second product of the transformer 63. Since the volt second product, however, is a monotonic, approximately linear function of bias current, control of the bias current will control the volt second rating of the control transformer 63. Moreover, for any given bias current, the associated volt second product will be a constant.

In the d-c to d-c converter of FIG. 3, the bias control is achieved by comparing a sample of the output voltage to a reference in the error amplifier 50. The control transformer 63, in effect, converts this bias current into the necessary pulse width modulated drive signal as described above. Note that this drive transformer 63 also provides the desired isolation between the input supply voltage and the output voltage. It should also be noted that the width of the clock pulse can be very narrow since it need only sustain the drive to transistor 35 until the voltage $E_2$ is capable of maintaining the drive. Furthermore, while the circuit of FIG. 3 shows only a single output winding 32, any desired number of outputs could have been employed.

In a circuit which was built according to FIG. 3, output voltage variations due to changes in the input voltage were reduced by more than 30 db in addition to the enclosed loop gain. Thus, for an "off line" converter operating from a rectified three phase 400 Hz. line (which generates approximately 12% peak-to-peak ripple at 2,400 Hz.), the output voltage was filtered by regulation to less than 0.1% of the d-c output voltage. This attribute makes a significant contribution to weight reduction and volume reduction for the power supply since it eliminates or minimizes input ripple filters.

Other advantages of the arrangement are the inherent isolation of the feedback channel and the need for a minimum clock pulse width which can be less than about 250 nanoseconds. The novel circuit also provides inherent line regulation over a very wide frequency band and permits reduction in the size of the magnetic components due to elimination of transient conditions.

The novel circuit also has very few parts and is therefore a low-cost high-reliability circuit. Among other advantages which have been previously stated, the circuit produces improved d-c regulation due to the additional 30 db inherent gain.

It is possible to carry out the invention in a single transformer version. The single transformer version is shown in block diagram in FIG. 4 where parts similar to those of FIG. 2 have similar identifying numerals. Thus, in FIG. 4, the single transformer, magnetically modulated feed forward converter, has the same input voltage as in FIG. 2 which, however, is applied to a saturable high-frequency output transformer 100. The output of the saturable transformer 100 is controlled by a transistor switch arrangement 101, which is current limited, and the output is applied through the output rectifiers 22 and filter 23 in the usual manner. The feedback sample circuit 24 (which need not be isolated in the arrangement of FIG. 4) is then applied through the error amplifier circuit 25 and is connected back to transformer 100. Coupling is also provided from output transformer 100 to the transistor switch 101 and a clock frequency circuit is input to the transistor circuit 101.

Figure 5:
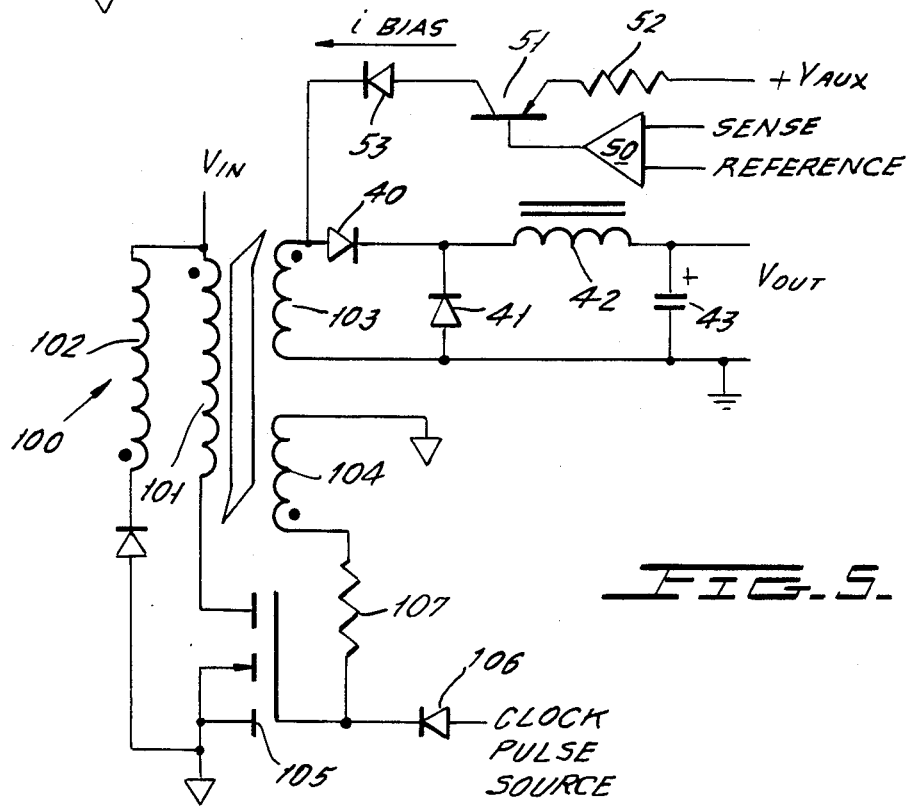
FIG. 5 is a circuit diagram of the arrangement of FIG. 4.

A detailed circuit for carrying out the block diagram arrangement of FIG. 4 is shown in FIG. 5. IN FIG. 5, transformer 100 is a saturable transformer having primary winding 101, reset winding 102 and secondary windings 103 and 104. The polarity of the windings is indicated by the conventional dots. The input voltage is applied to the primary winding 101 and through the high power MOSFET transistor 105. A source of clock pulses is applied to the gate of transistor 105 through the diode 106.

Secondary winding 104 is connected through resistor 107 to the gate circuit of transistor 105 as shown. The output of winding 103 is connected through the same components 40, 41, 42 and 43 as were used in FIG. 3. The bias control circuit is similar to that of FIG. 3 and includes error amplifier 50, transistor 51, resistor 52 and diode 53. The bias current output through transistor 51, however, is connected directly to the secondary winding 103 of the saturable transformer 100, rather than to the separate drive transformer, as in FIG. 3. The input circuits to the amplifier 50 consist of a reference input and a sense input which can be derived from a resistance divider across the output voltage, as in FIG. 3.

The operation of the circuit of FIG. 5 is essentially identical to that of FIG. 3 except that the functions of the transformer 20 and the drive transformer 63 of FIG. 3 are combined in the single saturable transformer 100 of FIG. 5. Note that the transformer 100 of FIG. 5 is a relatively large transformer since it is operated only between its residual flux density and saturation.

Although the present invention has been described in connection with a number preferred embodiments thereof, many variations and modifications will now become apparent to those skilled in the art. It is preferred, therefore, that the invention be limited not by the specific disclosure herein, but only by the appended claims.

What is claimed is:

1. A magnetically modulated d-c to d-c feed forward converter comprising:
   a source of input d-c voltage;
   an output transformer means connected to said source of input d-c voltage, said output transformer means having a primary winding, a reset winding and at least first and second secondary windings;

a switching transistor means connected in series with said primary winding and source of input voltage; said switching transistor means haing a control electrode;

an output rectifier means connected to said first secondary winding and filter means connected to said output rectifier means to produce a filtered output d-c voltage;

clock pulse generator means producing a pulse train for repetitively turning on said switching transistor means;

coupling circuit means for coupling said clock pulse generator means to said control electrode; said coupling circuit means including a saturating transformer core coupled to said second secondary winding and being driven from its residual flux density to saturation flux density by the output voltage of said second secondary winding, whereby said switching transistor means is repetitively turned on for a cycle time starting with a clock pulse from said clock generator means and ending when said saturating transformer core reaches saturation flux density;

said reset winding connected in bypass-circuit relation with respect to said switching transistor means and resetting the flux of said output transformer means following the saturation of said saturating transformer core.

2. The converter of claim 1, wherein said output transformer means has a non-saturating core, and wherein said saturating transformer core has a secondary winding coupled to said control electrode and a primary winding connected to said second secondary winding of said output transformer means.

3. The converter of claim 1, wherein said saturating transformer core is the core of said output transformer means.

4. The converter of claim 1 which further includes d-c bias circuit means magnetically coupled to said saturating transformer core; the current of said d-c bias circuit adjusting the quiescent residual flux density point of said saturating transformer iron core and thus the total available flux excursion of said core to its saturation point.

5. The converter of claim 4 which further includes feedback regulation circuit means coupled between said filtered output d-c voltage and said d-c bias circuit means.

6. The converter of claim 2 which further includes d-c bias circuit means magnetically coupled to said saturating transformer core; the current of said d-c bias circuit adjusting the quiescent residual flux density point of said saturable transformer core and thus the total available flux excursion of said core to its saturation point.

7. The converter of claim 3 which further includes d-c bias circuit means magnetically coupled to said saturating transformer core; the current of said d-c bias circuit adjusting the quiescent residual flux density point of said saturable transformer core and thus the total available flux excursion of said core to its saturation point.

8. The converter of claim 6 which further includes feedback regulation circuit means coupled between said filtered output d-c voltage and said d-c bias circuit means.

9. The converter of claim 7 which further includes feedback regulation circuit means coupled between said filtered output d-c voltage and said d-c bias circuit means.

10. The converter of claim 1 which includes a diode connected in series with said reset winding.

11. The converter of claim 4, wherein said d-c bias circuit means is connected to one of said secondary or primary windings of said saturating transformer core.

12. The converter of claim 11 which includes a diode connected in series with said reset winding.

13. The converter of claim 12 which further includes feedback regulation circuit means coupled between said filtered output d-c voltage and said d-c bias circuit means.

* * * * *